May 10, 1960 C. F. OESTERMEYER Re. 24,824

GROUND MEAT MOLD

Original Filed June 25, 1952

INVENTOR.
CARL F. OESTERMEYER
BY
Schramm and Knowles
Attorneys

United States Patent Office

Re. 24,824
Reissued May 10, 1960

24,824

GROUND MEAT MOLD

Carl F. Oestermeyer, Shaker Heights, Ohio

Original No. 2,722,713, dated November 8, 1955, Serial No. 295,500, June 25, 1952. Application for reissue November 5, 1959, Serial No. 851,207

7 Claims. (Cl. 17—32)

Matter enclosed in heavy brackets [ ] appears in the original patent but forms no part of this reissue specification; matter printed in italics indicates the additions made by reissue.

The present invention relates to an improved method and device for forming ground meat or hamburger patties, and more particularly to a mold for the formation of such patties.

Previously there have been many machines of various types which form ground meat patties, but all such mechanisms have been large, expensive and cumbersome. They have, by and large, been designed for restaurant or other volume use. The present invention, on the other hand, is designed for home use, and is not intended to be used to produce meat patties in large volume.

One of the principal objects of this invention is to provide an inexpensive device which will provide a means of forming meat patties of uniform size and shape. Patties thus formed may be stored in any of the various types of refrigeration units or by other food storage methods in preparation for subsequent immediate use.

Another object of this invention is to provide meat patties the contents of which are of uniform quantity to afford assurance that all persons who are to share the meal will receive appropriate portions.

By this means it is thus possible to obtain meat patties of sizes appropriate to satisfy the appetities of all of the members of the family, and at the same time provide uniform fair proportionment of a quantity of meat into appropriate sizes. For example, with a family of four children, a housewife may provide the two larger children with identical large size patties and the two small children with identical small size patties and thus avoid intra-family disputes over the portions served.

In preparing a meal, a housewife is frequently faced with the problem of providing meat cooked at different degrees for persons of different tastes. Some members of the family may prefer, for example, rather "rare" meat patties while others prefer that theirs be "well done." The housewife's problem can be greatly simplified if she may consistently, over a period of time, provide patties which with identical periods of cooking, are both rare and well done. Through experience, she will come to know just what period of time and cooking temperatures are necessary to obtain this objective.

It is then a further object of this invention to provide a device whereby a housewife may provide meat patties cooked to the exact taste of the various members of the family consistently and uniformly in successive meals, without being forced to obtain the experience and skill necessary to accomplish this result without patties of consistent uniform thickness. An object then is to eliminate the need for experience, as for example judging the cooking time necessary for patties of thickness which may vary infinitely to cook them to exactly satisfy the taste of all members of the family.

Even the most experienced of cooks will sometimes waste meat because they err in determining the amount of time necessary to completely cook, and at the same time, not overcook a given patty. Their judgment may well fail when determining by eye, as is the custom, the thickness of the patty and hence the requisite cooking time. It is then an additional object of this invention to provide the housewife with patties in which the possibility of error due to judgement as to the needed cooking time is completely eliminated.

The invention resides in certain constructions and combinations and arrangements of parts and further objects and advantages thereof will be apparent to those skilled in the art to which the invention relates form the following description of the preferred embodiment of the invention hereinafter described with reference to the accompanying draws forming a part of this specification in which similar reference characters designate corresponding parts and in which.

Figure 4:
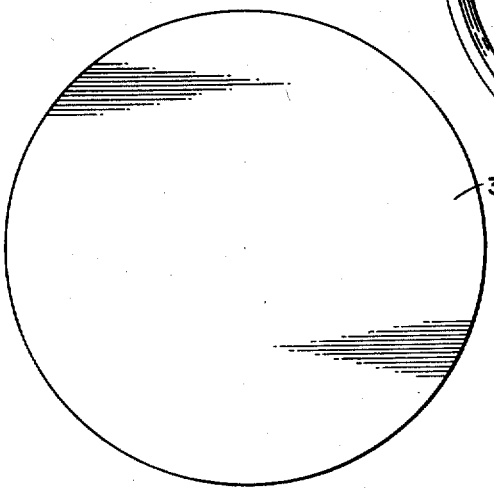
Fig. 4 is a top view of the removable mold base or disc.

In its preferred embodiment the ground meat patty mold consists of a cylindrically shaped annular open ended body or annulus 1, with an annular groove or depression 2 of concave section and circumferentially disposed in the peripheral surface of the body to form a ridge or ring 7, about the inner surface of the mold, in circumferential disposition thereof, and a circular disc 3, as shown in Figure 4.

In the preferred embodiment of the invention the body is formed from a cylindrical tube of plastic, aluminum, or other suitable material. The tube, of course, might be octagonal, square, or any other shape, but a cylindrical tube is preferred. The body 1 has a round axial passage 8 therethrough to provide a hollow construction. The body 1 has a smooth internal surface 9 to define the circumferential limits of the passage 8. The groove or depression 2, lies in a plane which is transverse or normal to the axis of the body or housing 1 and it is formed in the peripheral surface of the body parallel to the ends of the cylindrical body, 5 and 6, and something other than equidistant therebetween to divide the food molding chamber 8 into large and small food receiving portions. In the preferred embodiment the distance from the top of the mold 6, to the top of the annular ring or stop 7, is one-half inch, and the distance from the bottom of the ring or stop formation 7, to the bottom of the mold 5, is five-sixteenths of an inch, while the inside diameter is approximately 4 inches.

*Thus, the thickness ratio of the two sizes of patties is about 8 to 5, and the diameter of the device is about 8 times the axial length of the thicker of the two molding chambers.*

The circular disc 3 is designed to form the bottom of the mold, and also serve as a means to be used to force the meat from the mold when it has been shaped into a patty. The circular disc may be inserted from either end of the mold to permit a selection of either of two thicknesses for the ultimate size of patties thus formed.

To form a meat patty which is the thickest of the two alternatives the body of the mold 1 is placed with the end 5, which is the closest to the annular ring 7, down. The disc or partition member 3 is inserted by rectilinear movement into the food molding chamber or space 8 in the upper of the food shaping portions of the chamber, and located against or placed in engagement with the stop 7. Ground meat is then placed in the upper end of the mold. When the cavity in the mold has been filled with ground meat and the excess meat has been removed, the entire device is inverted, and the ground meat is removed from the mold by pressing on the disc 3 and removing the body 1 of the mold. Thus, the meat and disc or partition member 3 are removed from the mold as a unit. The meat is then severed from the disc through the use of a knife, spatula, or other suitable means.

If one wishes to form a meat patty which is the thinner of the two possibilities, one merely places the body of the mold with the end 6, which is the farthest from the annular ridge down, and then one performs the same operation as is outlined above for the formation of the thicker patty.

Figure 1:
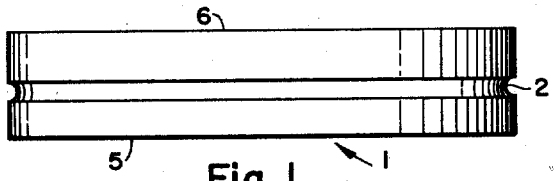
Fig. 1 is an elevational view of the mold in its preferred embodiment.
Figure 2:
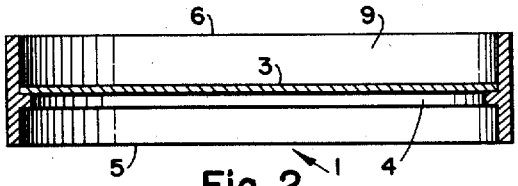
Fig. 2 is a sectional view of the mold in an alternate embodiment.
Figure 3:
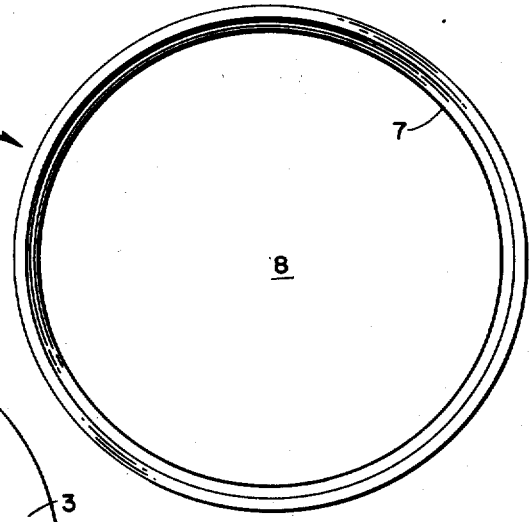
Fig. 3 is a top view of the mold.

The annular ridge or stop 7 may be formed by rolling which will distend the body walls inwardly to produce a ridge such as that portrayed in Fig. 3, or one may machine the interior of the body to produce a ridge such as that portrayed at 4 in Figure 2, or a series of concave dimples, not shown, may be embossed about the periphery of the body of the mold, or any other alternative may be used which will produce a suitable support for the circular disc 3, when it is inserted in the mold.

While the preferred embodiment has been described in considerable detail, the invention is not limited to the construction shown and it is our intention to hereby cover all adaptations, uses, and modifications thereof which come within the spirit and scope of the appended claims.

Having thus described my invention, what is claimed is:

1. A device for shaping ground meat patties comprising a hollow body member having a substantially cylindrically shaped smooth walled internal chamber open at opposite ends, said body member having *rigid* stop formation located in a plane which is transverse to the axis of the chamber and projects into the chamber from the internal chamber walls, said formation dividing the chamber walls into smooth cylindrically surfaced portions, one of the portions having a greater longitudinal extent than the other, a partition member disposed in the chamber and seated against the formation to divide the chamber into parts of different sizes, said partition member being formed with a circular periphery having a close running fit with the smooth chamber walls and being axially slidable into and out of the chamber from either end opening by direct rectilinear motion for optional seating disposition against either side of the stop formation whereby to define alternatively cylindrically walled chamber portions of different axial extent, said partition member being axially displaceable from seated position by axial pressure applied thereto through one end opening for movement through the other end opening whereby to facilitate removal of a formed meat patty from one of the cylindrically walled chamber portions without disturbing meat particles comprising such patty.

2. A device for use in a ground meat mold to slidably embrace a flat circular disc, said device comprising a body of thin wall section having a round construction with a smooth internal surface, round parallel *unobstructed* ends on the body, a round sectioned passage extending axially throughout the length of the body and of substantially uniform section from end to end, the passage being of uniform diameter from end to end defined by the smooth inner surface of the body, and a *rigid* stop inwardly projecting from the inner surface and interrupting the periphery of the passage, the stop being between and parallel to the ends of the body, and the axial distance of the stop from one end being greater than the axial distance from the other end *by a ratio of about 8 to 5.*

3. A food mold comprising an annular member constituting the side walls of a molding chamber, the member being open at opposite ends and of uniform section from end to end, said member having *rigid* stop means distributed about the chamber in a plane normal to the chamber axis, and a *rigid* partition member insertable into the chamber through either of the end openings by direct rectilinear movement, the partition member being engageable with the stop means to locate the partition member axially in the chamber whereby to divide the chamber into food shaping portions of predetermined sizes, *and the diameter of the molding chamber being several times the axial length.*

4. A food mold comprising a thin walled metal housing, the housing having inner walls defining a food molding chamber of uniform section and being open at its ends, the housing having inwardly directed stop means located in a plane transverse to the molding chamber axis, and a partition member insertable into the chamber by direct rectilinear movement through either of the end openings, the partition member being engageable with the stop means to locate the partition member in the chamber whereby to divide the chamber into food shaping portions of unequal predetermined sizes.

5. A food mold comprising a hollow generally cylindrical thin walled metal body having openings at opposite ends the body having an internal surface defining a cylindrically shaped food molding chamber of uniform section, the body having an inwardly extending embossed stop means formed by inward distention of parts of the body walls, the stop means being located in a plane normal to the axis of the body, and a circular disc insertable into the chamber by direct rectilinear movement through either of the end openings, the disc being engageable with the stop means to divide the chamber into food shaping portions of unequal predetermined sizes.

6. A mold for plastic food comprising an annulus defining a molding space open at opposite ends and of uniform section along the axis of the annulus, a *rigid* partition receivable within the annulus, the annulus being formed with *rigid* stop means located in a plane spaced from both ends of the annulus and engageable with partition at a number of points spaced about the periphery of the partition to locate the latter axially in the molding space, the partition being insertable into and removable from the molding space by direct rectilinear movement through the open ends of such space, said inserted partition when located against the stop means serving to divide the space into separate portions of predetermined sizes, *said annulus having a diameter several times the axial length,* whereby food placed in one of the space portions is molded to predetermined size and is removable from such space portion with the partition as a unit by direct rectilinear movement for subsequent separation of the removed food from the removed partition.

7. *A ground meat mold comprising, a thin walled housing, the housing having inner walls defining a food molding chamber of uniform section open at its ends, the housing having inwardly directed stop means located in a plane transverse to the molding chamber axis to provide a rigid stop non-deformable by meat molding use, said stop means dividing the chamber into two food molding portions, the portions having axial dimensions of a ratio with respect to one another of about 8 to 5, the diameter of the chamber being about 8 times the axial length of the smaller chamber portion, and a rigid partition member insertable into the chamber by direct rectilinear movement through either of the end openings, the partition member being engageable with the stop means to locate the partition member in the chamber whereby to divide the chamber into meat shaping portions of unequal predetermined sizes.*

References Cited in the file of this patent or the original patent

| | | |
|---|---|---|
| 616,871 | Allen | Jan. 3, 1899 |
| 876,339 | Farmer | Jan. 14, 1908 |
| 1,531,569 | Rade | Mar. 31, 1925 |
| 1,896,313 | Hubbell et al. | Feb. 7, 1933 |
| 2,033,574 | Henderson | Mar. 10, 1936 |
| 2,052,734 | Walter | Sept. 1, 1936 |
| 2,228,644 | Sackas | Jan. 14, 1941 |
| 2,506,213 | Hall | May 2, 1950 |
| 2,519,271 | Miller | Aug. 15, 1950 |
| 2,574,831 | Jameson et al. | Nov. 13, 1951 |

FOREIGN PATENTS

| | | |
|---|---|---|
| 5,060 | Sweden | Apr. 21, 1894 |